United States Patent [19]

Koeppe

[11] Patent Number: 4,852,093
[45] Date of Patent: Jul. 25, 1989

[54] METHOD FOR SIMULATING A FAULT IN A LOGIC CIRCUIT AND A SIMULATION MODEL FOR THE IMPLEMENTATION OF THE METHOD

[75] Inventor: Siegmar Koeppe, Laatzen, Fed. Rep. of Germany

[73] Assignee: Siemens Aktiengesellschaft, Berlin and Munich, Fed. Rep. of Germany

[21] Appl. No.: 56,896

[22] Filed: Jun. 3, 1987

[30] Foreign Application Priority Data

Jun. 6, 1986 [DE] Fed. Rep. of Germany ........ 3619023

[51] Int. Cl.⁴ .............................................. G06F 15/20
[52] U.S. Cl. ........................................ 371/23; 364/578
[58] Field of Search ..................... 371/23, 20, 26, 15; 364/578; 324/73 R, 73 AJ, 73 PC

[56] References Cited

U.S. PATENT DOCUMENTS

| | | | |
|---|---|---|---|
| 3,715,573 | 2/1973 | Vogelsberg | 371/23 |
| 3,780,277 | 12/1973 | Armstrong | 371/23 |
| 4,156,132 | 5/1979 | Hazzard | 371/23 |
| 4,228,537 | 10/1980 | Henckels | 371/23 |
| 4,242,751 | 12/1980 | Henckels | 371/23 |
| 4,308,616 | 12/1981 | Timoc | 371/23 |
| 4,342,093 | 7/1982 | Miyoshi | 371/23 |
| 4,669,083 | 5/1987 | Laviron | 371/23 |

OTHER PUBLICATIONS

Wadsack R. L., "Fault Modeling . . . Integrated Circuits", Bell System Technical Journal, vol. 57, No. 5, May–Jun. 1978, pp. 1449–1459.
Wadsack, "Fault Modeling and Logic Simulation of CMOS and MOS Integrated Circuits".
Sunil Jain and Vishwani Agrawal, "Test Generation for MOS Circuits Using D-Algorithm".

Primary Examiner—Michael R. Fleming
Attorney, Agent, or Firm—Hill, Van Santen, Steadman & Simpson

[57] ABSTRACT

A method for simulating an erroneously-delayed signal switching at the output of the logic circuit utilizing a modified simulation model which is inherently suited for the simulation of a stuck-open fault and which, in particular, comprises an output stage which takes the signal storage appearing given this fault into consideration is disclosed. The modification is comprised in that the storage behavior of the output stage is suppressed after one clock period.

10 Claims, 2 Drawing Sheets

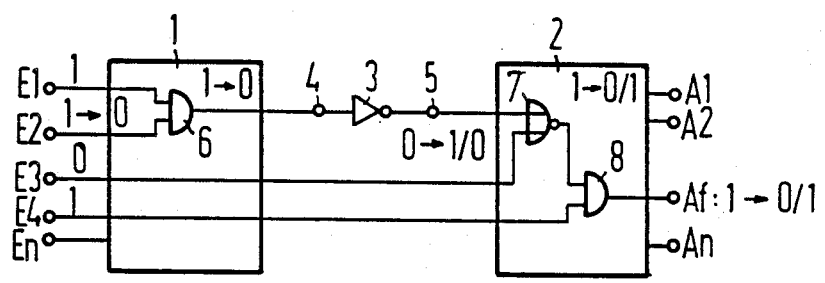
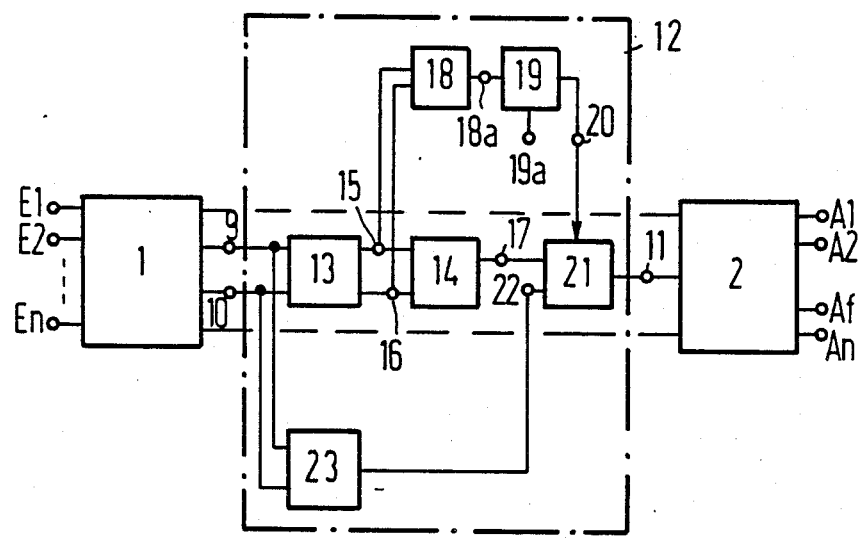

FIG 3
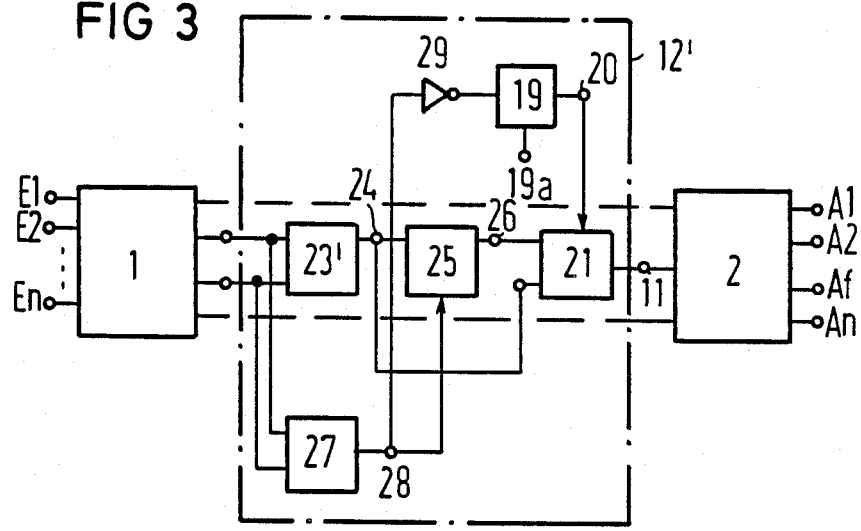
FIG 4
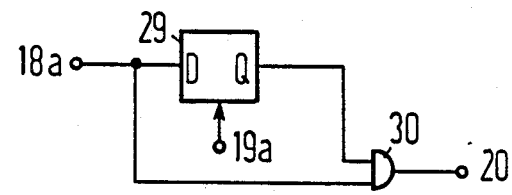
FIG 5
FIG 6
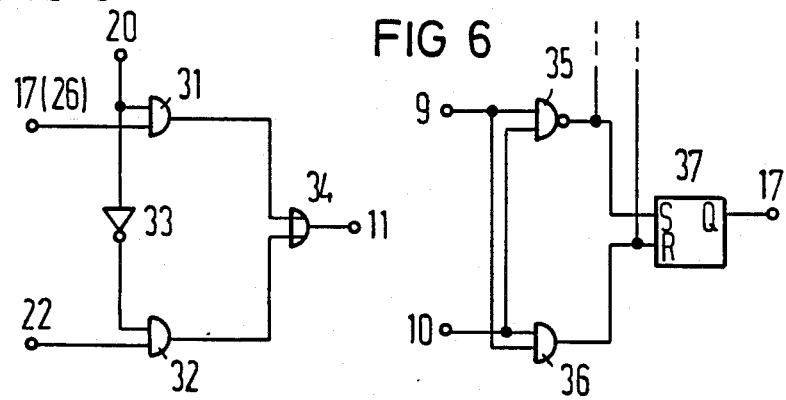

METHOD FOR SIMULATING A FAULT IN A LOGIC CIRCUIT AND A SIMULATION MODEL FOR THE IMPLEMENTATION OF THE METHOD

CROSS-REFERENCE TO RELATED APPLICATION

This application is related to an application Ser. No. 056,894, filed on June 3, 1987.

BACKGROUND OF THE INVENTION

1. Field of the Invention

The present invention is directed to a method for simulating a fault in a logic circuit comprising field effect transistors, whereby output bit patterns are derived from the sequence of input bit patterns applied in respectively successive clock periods via a simulation model simulating a fault. Such therefor, output bit patterns are compared to reference patterns valid in a fault-free case and is also directed to a simulation model for implementing the method.

2. Description of the Prior Art

With reference to FIG. 1, a logic circuit is illustrated and it is assumed that a fault of the logic circuit is difficult to recognize or simulate. One therefore proceeds from a digital circuit which contains a portion 1 at the input side and a portion 2 at the output side. The portion 1 comprises a series of digital inputs E1 . . . En and the portion 2 comprises a series of digital outputs A1 . . . An. A logic circuit, for example an inverter 3, to be tested in view of its operability is connected to an output 4 of the portion 1 via its input and connected to an input 5 of the portion 2 of the digital circuit via its output. In the initial condition of this circuit, it is assumed that a bit pattern 1, 1, 0, 1 is applied to the inputs E1, E2, E3 and E4, whereby a logic "1" occurs at the output 4 of an AND gate 6 and, therefore, at the input of the inverter 3. The output of the inverter 3, accordingly, lies at the logic level "0", just as does the first input of an NOR gate 7 which is arranged in the circuit portion 2 of the digital circuit. The second input of the NOR gate 7 is connected to a "0" level via the input 3, so that a "1" is applied to the first input of the AND gate 8 via the output of the NOR gate 7, the second input of the AND gate 8 being applied with a "1" level via the input 4. Accordingly, a "1" level is output to the output Af via the output of the AND gate 8. When, subsequently, a second input pattern 1, 0, 0, 1 is applied at the inputs E1—E4, then the respective logical signals "0", "1", "0" and "0" occur at the output points 4, 5 and at the output of the NOR gate 7 and at the digital output Af as likewise indicated in the drawing.

It is essential, however, that the bit pattern at the input side be applied to the inputs E1 . . . En in synchronization with a clock signal at the respective beginning of individual, successive clock periods. Likewise, the output patterns derived from these via the portions 1, 3 and 2 are interrogated or, respectively, evaluated at the outputs A1 . . . An at the respective beginning of the next-successive sampling periods. The inverter can then comprise a fault so that one of its circuit branches exhibits an inadmissibly low conductivity. Given a circuit constructed in accordance with the integrated circuit technology, for example, the cause of this fault can be excessively-high impedance contacting, a constriction of an interconnect or a threshold voltage shift of a field effect transistor. Given the assumption that this fault is present in the circuit branch (pull-up path) connecting the inverter output to a terminal of the supply voltage, the following effects derive for the occurring output bit pattern. At the beginning of a defined, first clock period, the circuit placed in an initial condition by supplying the input pattern 1, 0, 0, 1 at the inputs E1 . . . E4. A logical "0" is therefore applied to the inverter input. The output of a fault-free inverter would then be reloaded from "0" to "1" within the clock period. Due to the fault, however, the reloading of the inverter output occurs so slowly that the circuit portion 7, 8 and Af connected to the inverter output still evaluates its potential as "0" at the time of evaluation, i.e. at the beginning of the following, second clock period. The signal deviations which are respectively indicated following the oblique strokes at the appertaining circuit portions in FIG. 1 thereby occur. The signal error can be recognized at the digital circuit output Af because a "1" logic level appears instead of the anticipated "0" logic level. Insofar as the inverter input is again occupied with a "0" logic level in the aforementioned second clock period, the delayed reloading operation can be concluded in the clock period. This means that the inverter output is switched to a "1" level delayed by one clock period. The erroneously-delayed signal change at the inverter output can therefore only be recognized at the digital circuit output Af during the first clock period.

A local delay error occurs in a general logic circuit to be tested for operability which, for example, is arranged between a plurality of outputs of a portion 1 and a plurality of inputs of a portion 2 of the digital circuit of FIG. 1 and then two input bit patterns must be successively supplied for the purpose of fault recognition. Of these, the first bit pattern applied in a first clock period is referred to as an initialization pattern and the second pattern applied in the successive clock period is referred to as a fault-recognition pattern. For the above-specified example of a faulty inverter, a possible initialization pattern comprises the bits, 1, 1, 0, 1 for the inputs E1—E4, whereas a fault-recognition pattern is applied to the inputs with the bits 1, 0, 0, 1. The local delay fault can likewise only be recognized in a single clock period when testing a general logic circuit.

In a simulation method, one then proceeds such that the logic circuit to be tested is simulated by a simulation model which is inserted between the circuit portions 1 and 2 of the digital circuit in accordance with the real logic circuit. A defined, local delay error is contained in this simulation model. In a plurality of successive clock periods, a sequence of n-placed bit patterns is then applied to the inputs E1 . . . En. The respective output patterns derived via the circuit portion 1, the simulation model and the circuit portion 2 then appear at the outputs A1 . . . An, these being registered and compared to reference patterns which are determinant for a fault-free case. Each input bit pattern which leads to an output pattern that deviates from the corresponding reference pattern in terms of at least one bit is qualified as a fault-recognition pattern. When a fault-recognition pattern identified in this manner is supplied to the digital circuit to be tested and wherein the simulation model is replaced by a corresponding, realized target logic circuit, then one can conclude the presence of the simulated delay error in the target logic circuit when an output pattern appears at the outputs A1 . . . An which corresponds to the pattern that appeared in the simulation method as a consequence of the simulated fault.

SUMMARY OF THE INVENTION

The object of the present invention, therefore, is to provide a method of the type set forth above with which a local delay error of a logic circuit can be simulated in a simple manner.

According to the present invention, a method is set forth for the simulation of a fault in a logic circuit comprising field effect transistors, whereby the output bit patterns are derived from a sequence of input bit patterns applied in respective successive clock periods via a simulation model simulating a fault and wherein the output patterns are compared to reference patterns valid in a fault-free case. The method is particularly characterized in that, for the simulation of a delay error of the logic circuit, a simulation model for the simulation of a stuck-open fault of the logic circuit is utilized, whereby a signal storage associated with a stuck-open fault is taken into consideration by the function of a switching stage of the simulation model which through-connects a signal appearing at the output of the logic circuit and which is not influenced by the stuck-open error through to its output. However, given the appearance of a signal influenced by the stuck-open fault, the signal which appeared immediately therebefore at the output of the logic circuit is maintained and of the through-connection terminated for a single clock period.

For the simulation of a local delay error, one can proceed from known simulation models which serve for the simulation of stuck-open faults, whereby these simulation models can be augmented to such a degree with little expense that they are suitable for the simulation of a local delay error.

According to a particular feature of the invention, upon termination of the through-connection of the signal which appeared immediately therebefore at the output of the logic circuit, the latter is replaced by the output signal appearing given a fault-free logic circuit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a digital circuit which contains a logic circuit affected by a local delay error as a sub-circuit;

FIG. 2 is a basic circuit diagram of a first embodiment of a simulation model constructed in accordance with the present invention;

FIG. 3 is a basic circuit diagram of a second embodiment of a simulation model constructed in accordance with the present invention;

FIG. 4 is a preferred circuit-oriented execution of a sub-circuit which may be employed in the circuit of FIG. 2 and FIG. 3;

FIG. 5 is a preferred circuit-oriented execution of another sub-circuit which may be employed in the circuits of FIG. 2 and FIG. 3; and FIG. 6 illustrates, in schematic form, a portion of a simulation model for testing a AND gate for the presence of a local delay error.

DESCRIPTION OF THE PREFERRED EMBODIMENTS

In FIG. 2, a logic circuit to be tested for the presence of a local delay error, which is connected to the outputs 9 and 10 of the portion 1, via its inputs, and which is connected to the input 11 of the portion 2 of a digital circuit via its output, is simulated by a simulation model 12 constructed in accordance with the present invention. The simulation model 12 contains a simulation stage 13 which, in communication with the following circuit stage 14, simulates the logic circuit such as though it did not contain a circuit branch having an inadmissibly low conductivity, but contained a circuit branch having a stuck-open fault. Such a stuck-open fault produces a signal storage at its circuit point of the logic circuit. When, in particular, it is assumed that this circuit point comprises a capacitance of adequate size such as found in a field effect transistor, the charge state of the capacitance respectively present when the stuck-open fault takes effect is retained.

This effect of a charge storage is taken into consideration by storage stage 14 which has its two inputs connected to two outputs 15, 16 of the simulation stage 13. The output of the storage stage 14 is referenced 17. The storage stage 14 functions to transmit therethrough to 17 every signal appearing at the output 15 of the simulation stage 13 which is not influenced by the stuck-open fault simulated in the simulation stage 13 however, by contrast, the storage does not through-connect this signal given the appearance of the signal influenced by the simulated fault, but continues to maintain the through-connection of the last signal that appeared before the appearance of the fault-affected signal at the output 15. The control of the output stage 14 occurs dependent on the signals appearing at the outputs 15 and 16 of the simulation stage 13. The simulation stage 13 is thereby designed such that a signal influenced by the stuck-open fault generates a logical "0" respectively at both outputs 15 and 16. The publication "Proc. of 20th Design Automation Conf. 1983", pp. 64–70 shows and describes some gate circuits affected by stuck-open faults and the corresponding simulation stages including the appertaining output stages. For example, FIG. 1 of this publication shows a complementary-metal-oxide-semiconductor (CMOS) gate and FIG. 3 of that publication shows the corresponding simulation and output stage. FIG. 3 references the output stage 14 as a logic block B whose function table, which may be derived from the Table I on Page 65, coincides with that of a RS flip-flop.

A check is carried out in a detector 18 having its two inputs applied to the outputs 15 and 16 to see whether the simulation stage 13 is located in a switch stage wherein a logical "0" appears at both the outputs 15 and 16. When this is the case, then a logical "1" is output at the output 18a of the detector 18. The detector 18 can thereby be composed, for example, of an NOR gate. The output signal of the detector 18 is supplied to an evaluator 19 whose clock input 19a has clock pulses applied thereto which respectively appear at the beginning of the individual clock periods. The evaluator 19 checks whether the signal combination 0, 0, is present at the outputs 15 and 16 of the simulation stage 13 during two successive clock periods. When the signal combination 0, 0 does not appear, or appears only during the single clock period, then a logical "1" level is output to the output 20 of the evaluator 19 and is used to control the output of a multiplexer 21. When, however, the signal combination 0, 0 appears at the outputs 15 and 16 during two successive clock periods, the evaluator 19 emits a logical "0" level at the output 20. Given reception of a control signal "1" at the terminal 17 the signals are disconnected from the output 11 and the signals applied to its input 22 are instead through-connected to the terminal 11. The input 22 is thereby connected to the output of a fault-free simulation stage 23 which is driven in parallel to the simulation stage 13 and is constructed such that it simulates the function of a fault-free logic circuit to be tested.

In operation, circuit elements 13-23 function in the following manner. When the fault-significant signal combination 0, 0 appears at the outputs 15 and 16 solely during a single clock period, the signal stored at the output 17 of the output stage 14 which serves as an initialization signal for the recognition of the local delay error in the simulation stage 13 is through-connected to the output 11 and, therefore, is available for a recognition of this fault at the output Af. When, however, the signal combination 0, 0 continues to exist at the outputs 15 and 16 during two successive clock periods, then the signal stored at the output 17 is disconnected from the output 11 and is replaced by the output signal of the fault-free simulation stage 23. Therewith, however, a fault recognition is limited to a single clock period at whose beginning the signal change at the inputs E1 . . . En necessary for fault recognition occurred. The reduction of the fault recognizability of a stuck-open error to a single clock period, effectively corresponds entirely to the desired simulation of a local delay error in the logic circuit to be investigated.

FIG. 3 illustrates an embodiment of the simulation model which departs from the circuit of FIG. 2, this being referenced 12'. A fault-free simulation stage 23' of the logic circuit to be tested is provided herein, its two inputs being connected to the outputs 9 and 10 of the portion 1 of the digital circuit. The output 24 of the simulation stage 23' is connected to the first input of the multiplexer 21 by way of an output stage 25 whose output is referenced 26, whereas the second input of the multiplexer 21 is connected to an output 24 of the simulation stage 23'. A selection circuit 27 is provided with a simulated stuck-open error which is driven in parallel to the simulation stage 23' via the outputs 9 and 10 and emits a logical "1" level via its output 28 given application of input signals which generate an output signal of the logic circuit which is not influenced by the simulated stuck-open error. The logical "1" level switches the output stage 25 so as to conduct the signals applied via the terminal 24 to the output 26. When, however, a fault recognition bit pattern is applied to the circuit 12' via the terminals 9 and 10 the logical signal "0" appears at the output 28 and prevents the transmission of the signal applied at the terminal 24 through to the output 26 and instead maintains the through-connection of the last signal which appeared at the terminal 24 before the interruption of the signal path 24-26.

The signal appearing at the circuit point 28 which controls the output stage 25 is also supplied to an inverter whose output signal proceeds to the evaluator 19. The remaining circuit portions of FIG. 3 correspond in terms of structure and operation to the circuit portions of FIG. 2 bearing the same reference characters. Given occurrence of the condition that signals which lead to output signals at the output of a logic circuit under test which are influenced by the simulated stuck-open fault are applied to the outputs 9 and 10 of the circuit portion 1 during the duration of two successive clock periods, the multiplexer 21 therein is also driven such that the signal applied at the terminal 24 and not influenced by the stuck-open fault is through-connected to the output 11 of the simulation model 12' instead of the signal applied at the terminal 26. Thus, by controlling the multiplexer 21 in this manner, the simulation of the stuck-open fault which appears for the duration of only one clock period effectively simulate the occurrence of a local delay error.

A simulation model set forth in the Bell System Technical Journal of May/June 1978, pp. 1455-1458, with particular reference to FIGS. 3 and 4, corresponds to the circuit portions 23', 25 and 27 of FIG. 3, and is fully incorporated herein by this reference.

The evaluator 19 connected between the circuit points 18a and 20 of FIG. 2 can advantageously be constructed in accordance with FIG. 4. The terminal 18a is thereby connected to the input of a D flip-flop 29. The D flip-flop 29 includes an output Q which is connected to the first input of an AND gate 30 whose second input is connected to the input 18a. The output of the AND gate 30 corresponds to the circuit point 20 of FIG. 1. The circuit point 19a thereby represents the clock input of the D flip-flop 29. When a logical "1" level is applied at the input 18a within a time interval which is longer than one clock period, then a logical "1" level is applied both at the input D and at the output Q of the flip-flop 29. This, however, means that the output of the AND gate 30 is placed at the logic level "0". As set forth, the multiplexer 21 is therefore switched from the output 17 to the output of a fault-free simulation stage 23, so that a simulation of a local delay error is guaranteed. An output circuit 19 constructed in accordance with FIG. 4 can also be utilized in FIG. 3.

An advantageous construction of the multiplexer 21 is illustrated in FIG. 5. Two AND gates 31 and 32 are provided in FIG. 5, the first inputs being connection to one another via an inverter 33. Furthermore, the first input of the AND gate 31 is connected with the output 20 of the evaluator 19. The second input of the AND gate 31, in the case of the simulation model 12, lies at the output 17 of the output stage 14, whereby the second input of the AND gate 32 corresponds to the input 22 of the multiplexer 21. The outputs of the AND gates 31 and 32 are applied to the inputs of an OR gate 34 whose output represents the output 11 of the multiplexer. In the case of the simulation model 12' of FIG. 3, the second input of the AND gate 31 is connected to the circuit point 26.

FIG. 6 illustrates the circuit-oriented execution of a simulation stage 13 utilized in the simulation model 12 of FIG. 2 and shows an appertaining output stage 14 which serve for the simulation of an AND gate comprising two input in complementary circuit technology. One AND gate 35 and one AND gate 36 thereby have their first inputs applied to the circuit point 9, whereas their second inputs are connected to the circuit point 10. The output of the AND gate 35 is applied to the S input of a RS flip-flop 37. The output of the AND gate 36 is connected to the R input of the flip-flop 37. The output Q of the RS flip-flop 37 corresponds to the circuit point 17 of FIG. 2.

A stuck-open fault in one of the two parallel branches of the simulated AND gate is simulated by a stuck-at fault of the first input of the gate 35. A stuck-open fault in the other of the two parallel branches is simulated by a stuck-at fault at the second input of the AND gate 35. These two stuck-at faults which are constructed as "stuck-at-1" faults are, in turn, simulated at the respective disconnected input of the AND gate 35 due to a disconnection of the respective input of the circuit point 9 or, respectively, 10 and due to the application of a level corresponding to a logic level "1". A stuck-open fault in the series branch of the simulated AND gate is simulated by a stuck-at fault at the output of the AND gate 36. This stuck-at fault is constructed as a "stuck-at-0" fault and is simulated in such a manner that the R input of the flip-flop 37 is disconnected from the output of the AND gate 36 and is seized with a level corresponding to a logic level "0".

Although I have described my invention by reference to particular illustrative embodiments, thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for simulating and detecting delayed signal switching in a logic circuit implemented with field effect transistors comprising the steps of:

generating a series of input bit patterns in respective clock cycles;

applying said series of input bit patterns to the inputs of first and second simulation models, said first simulation model having output signal characteristics responsive to said series of input bit patterns and indicative of a fault free design of said logic circuit, said second simulation model having output signal characteristics responsive to said input bit patterns and indicative of the occurrence of a stuck open fault within said logic circuit;

connecting the output signals of said first and second simulation models to a switching circuit capable of selectably supplying at the output thereof signals corresponding to either a fault free response to said input bit patterns such as supplied by said first simulation model or a stuck open fault condition as indicated at the output of said second simulation model;

generating as one of said series of input bit patterns a fault creating pattern causing said second simulation model to generate an output indicative of a stuck open fault condition, said fault creating pattern maintained for a duration of two clock periods;

detecting at the output of said second simulation the presence of said stuck open fault condition;

responding to the detection of said stuck open fault condition by maintaining the outputs of said switching circuit in the logic state existing immediately before the occurrence of said stuck open fault condition for one clock period; and selecting the outputs of said switching circuit to correspond to the output of a fault free logic circuit after the completion of said one clock period thereby to simulate the occurrence of a delayed signal switching error.

2. A method for simulating and detecting delayed signal switching in a logic circuit as recited in claim 1, further comprising the steps of:

acquiring said input bit patterns and the respective output response thereto at the output of said switching circuit during simulation modeling;

storing said input bit patterns and said respective output of said switching circuit as ordered pairs of acquired data;

applying said input bit patterns at the input of a logic circuit under test;

acquiring the output response of said logic circuit under test to said input bit patterns; and comparing the output response acquired at the output of said logic circuit under test to said ordered pairs of acquired data thereby to detect the existence of a delayed signal switching error in said logic circuit under test.

3. A simulation model for simulating a fault in a target logic circuit implemented with field effect transistors, said simulation model comprising:

signal generating means for generating at the output thereof a clocked series of bit patterns including fault recognition bit patterns, each of said fault recognition bit patterns sustained for a duration of at least two clock periods;

fault free simulation means connected to said signal generating means for receiving at the input thereof said bit patterns and generating therefrom output signals simulating a fault free operation of said target logic circuit;

stuck open fault simulation means connected to said signal generating means for receiving at the input thereof said bit patterns and capable of generating therefrom output signals indicative of a stuck open fault condition in said target circuit upon receipt by said stuck open fault means of said fault recognition bit patterns from said signal generating means; and switching means connected to the outputs of said fault free simulation means, said stuck open fault simulation means, and capable of receiving clock input signals synchronous with the generation of said clocked bit patterns for providing output signals simulating fault free operation of said target logic circuit and, upon receipt of said signals indicative of a stuck open fault condition, for maintaining at the output thereof the output signal state existing immediately prior to the detection of said signals indicative of a stuck open fault for a duration of one clock period, whereupon after the completion of said one clock period, output signals simulating fault free operation of said target logic circuit are again enabled thereby to simulate the occurrence of a local delay error.

4. A simulation model for simulating a fault as recited in claim 3, wherein said fault simulation means generates output signals simulating fault free operation of the target logic circuit whenever the input bit pattern received from said signal generating means is not a fault recognition bit pattern.

5. A simulation model for simulating a fault as recited in claim 4, wherein said switching means comprises:

storage means connected to the output of said fault simulation means for passing the fault free output of said fault simulation means therethrough to the output thereof and, upon detection of said signal indicative of a stuck open fault, retaining at the output thereof the signal state existing immediately prior to the detection of said signal indicative of a stuck open fault;

detector means connected to the output of said fault simulation means for sensing the occurrence of said signal indicative of a stuck open fault and generating therefrom a detector output indicative of the existence of a stuck open fault;

evaluator means connected to said detector output and capable of receiving said clock input signals for generating a control signal output therefrom whenever said detector output is in a state indicative of the existence of a stuck open fault for at least two consecutive clock periods;

multiplexer means connected to the outputs of said storage means, said fault free simulation means, and said evaluator means for transmitting therethrough to the output thereof the output of said storage means and for transmitting therethrough to the output thereof the output of said fault free simulation means whenever said control signal from said evaluator indicates that a stuck open fault has existed for at least two clock periods.

6. A simulation model for simulating a fault as recited in claim 5, wherein said evaluator comprises:

a D-Type Flip Flop having an input from said detector means connected to the "D" terminal thereof and a clock input capable of receiving said clock input signals; and a two input AND gate having a first input thereof connected to said "D" terminal of said D-Type Flip Flop, a second input connected to the "Q" output of said D-Type Flip Flop and an output connected as said control signal to said multiplexer means whereby a logic level "1" from said detector means indicating that a stuck open fault exists causes the output of said NAND gate to shift to a logic level "0" if said logic level "1" from said detector is present for more than one clock cycle.

7. A simulation model for simulating a fault as recited in claim 5, wherein said multiplexer comprises:

a first AND gate having a first input connected to said control signal output of said evaluator means, a second input connected to the output of said storage means;

a NOT gate having a first input connected to said control signal output of said evaluator means;

a second AND gate having a first input connected to the output of said NOT gate and a second input connected to the output of said fault free simulation model;

a third AND gate having a first input connected to the output of said first AND gate and a second input connected to the output of said second AND gate whereby the presence of a logic level "0" at said control signal transmits the signal level present at the output of said fault simulation model to the output of said third AND gate and the presence of a logic level "1" at said control signal transmits the signal level present at the output of said storage device to the output of said third AND gate.

8. A simulation model for simulating a fault as recited in claim 5, wherein said fault simulation stage and said storage means comprise:

a AND gate having a first input connected to a bit output of said signal generating means and a second input connected to a further bit of said signal generating means;

an AND gate having a first input connected to said bit output of said signal generating means and a second output connected to said further output of said signal generating means;

an S-R Flip Flop having the "S" input thereof connected to the output of said AND gate and the "R" input thereof connected to the output of said AND gate whereby the "Q" output of said S-R Flip Flop has the characteristics of the output of said storage means thereby to simulate a stuck open fault of a AND gate.

9. A simulation model for simulating a fault as recited in claim 3, wherein said switching means comprises:

storage means connected to the output of said fault free simulation means and the output of said stuck open fault simulation means for passing the fault free output of said fault simulation means therethrough to the output thereof and, upon detection of said signal indicative of a stuck open fault, retaining at the output thereof the signal state existing immediately prior to the detection of said signal indicative of a stuck open fault;

detector means connected to the output of said fault simulation means for sensing the occurrence of said signal indicative of a stuck open fault and generating therefrom a detector output indicative of the existence of a stuck open fault;

evaluator means connected to said detector output and capable of receiving said clock input signals for generating a control signal output therefrom whenever said detector output is in a state indicative of the existence of a stuck open fault for at least two consecutive clock periods;

multiplexer means connected to the outputs of said storage means, said fault free simulation means, and said evaluator means for transmitting therethrough to the output thereof the output of said storage means and for transmitting therethrough to the output thereof the output of said fault free simulation means whenever said control signal from said evaluator indicates that a stuck open fault has existed for at least two clock periods.

10. A simulation model for simulating a fault as recited in claim 9, wherein said multiplexer comprises:

a first AND gate having a first input connected to said control signal output of said evaluator means, a second input connected to the output of said storage means;

a NOT gate having a first input connected to said control signal output of said evaluator means;

a second AND gate having a first input connected to the output of said NOT gate and a second input connected to the output of said fault free simulation model;

a third AND gate having a first input connected to the output of said first AND gate and a second input connected to the output of said second AND gate whereby the presence of a logic level "0" at said control signal transmits the signal level present at the output of said fault simulation model to the output of said third AND gate and the presence of a logic level "1" at said control signal transmits the signal level present at the output of said storage device to the output of said third AND gate.

* * * * *